United States Patent
Pare, Jr. et al.

[11] Patent Number: 6,131,464
[45] Date of Patent: Oct. 17, 2000

[54] PRESSURE SENSITIVE BIOMETRIC INPUT APPARATUS

[75] Inventors: David Ferrin Pare, Jr., Berkeley; Philip Dean Lapsley; Jonathan Alexander Lee, both of Oakland, all of Calif.

[73] Assignee: SmartTouch, Inc., Berkeley, Calif.

[21] Appl. No.: 09/098,318

[22] Filed: Jun. 16, 1998

[51] Int. Cl.[7] .............................. G01L 7/00; G01L 3/00; G01D 7/00
[52] U.S. Cl. ......................... 73/714; 73/862.046
[58] Field of Search ..................... 356/71, 209; 382/1, 382/4, 71; 340/146.3 E; 257/415, 419; 73/705, 714, 862.046; 250/216

[56] References Cited

U.S. PATENT DOCUMENTS

| | | | |
|---|---|---|---|
| 3,975,711 | 8/1976 | McMahon | 340/146.3 E |
| 4,227,805 | 10/1980 | Schiller | 356/209 |
| 4,322,163 | 3/1982 | Schiller | 356/71 |
| 4,353,056 | 10/1982 | Tsikos | 340/146.3 |
| 4,358,677 | 11/1982 | Ruell et al. | 250/216 |
| 4,429,413 | 1/1984 | Edwards | 382/4 |
| 4,946,276 | 8/1990 | Chilcott | 356/71 |
| 5,400,662 | 3/1995 | Tamori | 73/862 |
| 5,416,573 | 5/1995 | Sartor, Jr. | 356/71 |
| 5,429,006 | 7/1995 | Tamori | 73/862 |
| 5,635,723 | 6/1997 | Fujieda | 250/556 |
| 5,844,287 | 12/1998 | Hassan et al. | 257/419 |

*Primary Examiner*—William Oen
*Attorney, Agent, or Firm*—Ali Kamarei

[57] ABSTRACT

The invention discloses a biometric input apparatus for obtaining a high quality image of the finger of a user. The biometric input apparatus has a finger image scanner which in turn has a contact surface where the user places their finger upon prior to scanning, means for obtaining an electronic image of the finger of the user that is placed on the contact surface, and a pressure sensor for detecting the amount of pressure that is applied by the finger of the user to the contact surface. In a preferred embodiment, the finger image scanner also has a logic device that measures the amount of pressure exerted by the finger of the user and compares said pressure to a predetermined threshold pressure value. In a most preferred embodiment the improved finger image scanner further has a feedback loop, wherein the logic device prompts the user to increase or decrease the pressure applied to the contact surface.

4 Claims, 4 Drawing Sheets

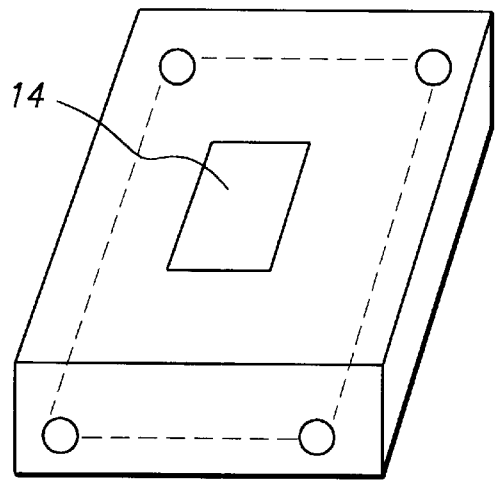
FIG. 5A
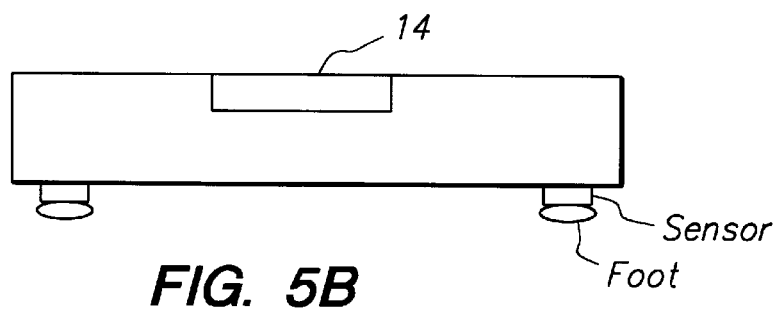
FIG. 5B
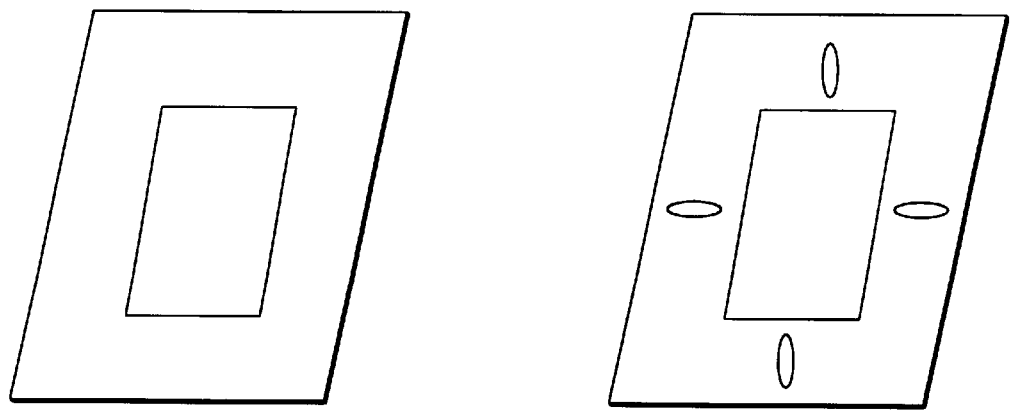
FIG. 6A     FIG. 6B

PRESSURE SENSITIVE BIOMETRIC INPUT APPARATUS

BACKGROUND

Biometric scanners and in particular finger image scanners are used to identify an individual from their unique characteristics in order to provide secured access to computer systems, secured areas, electronic communications, and electronic financial transactions.

In general finger image identification is accomplished by matching a bid finger image against a reference finger image. This is done by creating a "template" of each image by analyzing the ridges and valleys, and then comparing the two templates to determine if they are similar enough to effect either a successful or failed identification of an individual. In a good quality finger image, the majority of the image surface area consists of ridges that appear as dark lines and valleys that appear as lighter areas.

A significant problem with finger image identification systems is that of false rejection. A false reject happens when a biometric identification system incorrectly refuses access to a user who is actually an authorized user. This happens most frequently because of poor finger image quality obtained from the individual. For example, the finger image obtained by the biometric scanner may be too dark, or too light. First, in a finger image that is characterized as too dark, the valleys appear darker and thicker than normal and it becomes difficult or impossible to distinguish the valleys from the ridges. Several different factors can independently cause a dark finger image. These include a finger that is being pressed too hard or a finger that is too moist. Second, in a finger image characterized as too light, ridges that normally appear as dark areas are lighter in color or appear as broken ridge lines. When a light ridge image is combined with background noise that most scanners produce after repeated usage, it becomes very difficult to distinguish the light ridges from the background noise. Several independent factors can cause a light finger image including a finger that is too dry, a finger that is not being pressed hard enough on the finger image scanner, a finger whose ridges are very fine, and a finger that does not have any ridges at all. An example of each of these symptoms appear as FIGS. 1(a) through 1(d).

In either case, a finger image is that is either too light or too dark is of poor quality and would therefore be difficult to extract a good template using the image. In such cases it is much more difficult to make a proper identification of that individual. This situation often results in the false rejection of an authorized user, making the system appear unreliable.

Conventional scanners often scan images of fingers at pressure levels that are extremely unlikely to produce good images. The scanner's attached processor or logic device thereby wastes time and power determining if a good quality image is present. It is optimal that a scanner only capture an image when it has been determined that the pressure within the acceptable range of T1 and T2 is present and that a good image can be anticipated. This improves response time and saves power since the processor can sleep until a likely good image is present.

When an unsatisfactory image is obtained, it is possible to improve the image by immediately prompting the user to change the way he is using the scanner, instead of simply falsely rejecting the user. In many cases, pressing with less pressure causes the image to lighten, and pressing with more pressure causes the image to darken. Faced with a dark image, a conventional scanner might ask the individual to decrease the pressure on the scanner. Thus, a scanner needs to determine whether or not changing the pressure exerted by the finger of the user would be likely to increase image quality. It is difficult for a conventional scanner to determine this from a simple inspection of the finger image.

It is therefore an object of the invention to provide a finger image scanner that can detect if a problem with a given finger image is related to the exerted pressure, or whether the source of the problem is from another cause yet having the same symptoms.

It is another object of the invention to scan and process a finger image only under conditions which are likely to produce good quality images, thereby improving response time, and decreasing power consumption by not requiring the processor to process images that are almost guaranteed of being poor quality.

It is yet another objective of the invention to alleviate the problem of poor quality images by varying the amount of pressure that is exerted by the finger of the user regardless of other existing causes.

Another objective of the invention is to provide a finger image scanner that uses a minimum number of mechanical or electrical parts, and at a low cost.

SUMMARY

The invention discloses a biometric input apparatus for obtaining a high quality image of the finger of a user. The biometric input apparatus has a finger image scanner which in turn has a contact surface where the user places their finger upon prior to scanning, means for obtaining an electronic image of the finger of the user that is placed on the contact surface, and a pressure sensor for detecting the amount of pressure that is applied by the finger of the user to the contact surface.

In a preferred embodiment, the finger image scanner also has a logic device that measures the amount of pressure exerted by the finger of the user and compares said pressure to a predetermined threshold pressure value. In a most preferred embodiment the improved finger image scanner further has a feedback loop, wherein the logic device prompts the user to increase or decrease the pressure applied to the contact surface.

BRIEF DESCRIPTION OF THE DRAWINGS

FIG. 5 shows an embodiment where the pressure sensor is mounted between the enclosure and one of the enclosure's feet.

FIG. 6 shows an embodiment of the invention where the finger image sensor and the pressure sensor are combined in a single package.

DETAILED DESCRIPTION

The invention comprises a finger image scanner having a contact surface where the user places their finger upon prior to scanning, and means for obtaining an electronic image of the finger of the user that is placed on the contact surface. A pressure sensor detects the amount of pressure that is applied by the finger of the user to the contact surface.

Figure 1A:
FIG. 1(a) shows an example of finger image that is too dark.
Figure 1B:
FIG. 1(b) shows an example of a finger image that is too light.
Figure 1C:
FIG. 1(c) shows an example of a finger whose ridges are very fine.
Figure 1D:
FIG. 1(d) shows an example of a finger that does not have any ridges at all.
Figure 2:
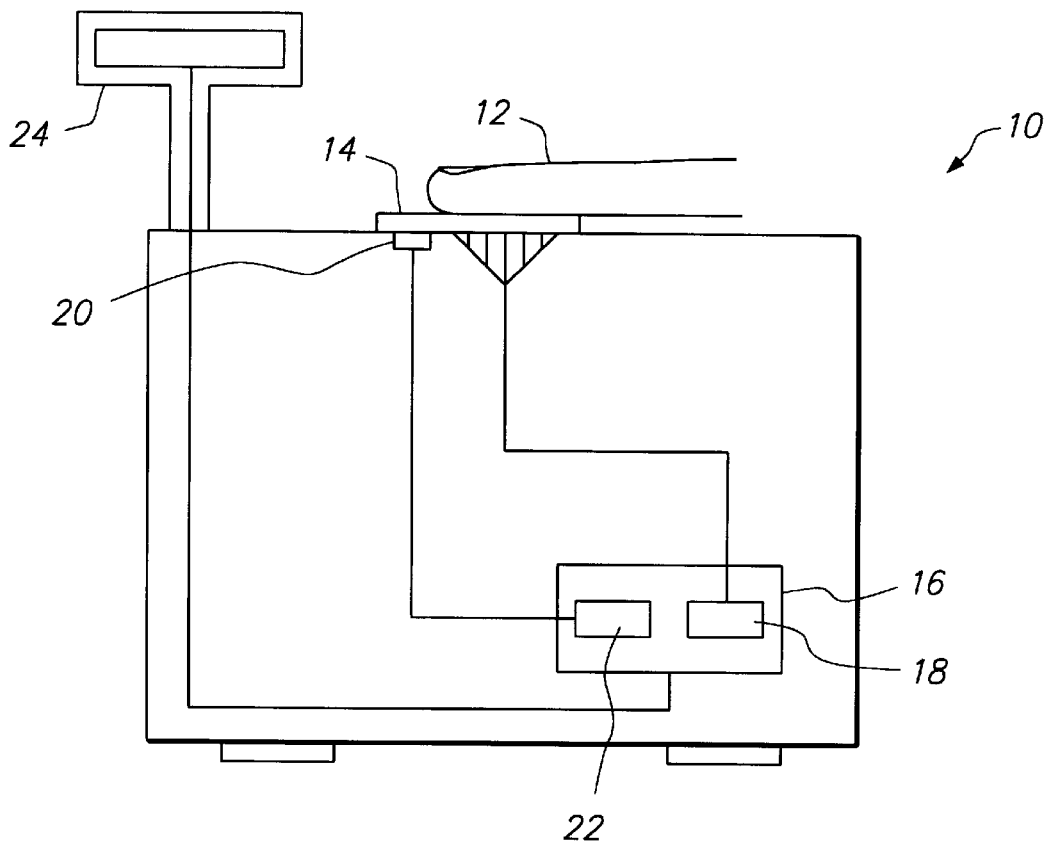
FIG. 2 shows a preferred device of the invention.

As shown in FIG. 2, a finger 12 to be scanned is placed upon the contact surface 14 of a finger image scanner 10. A pressure sensor 20 detects the amount of pressure exerted by the finger 12 upon contact surface 14. The pressure sensor 20 inputs data from measured pressure to a pressure processing module 22 of logic device 16. A logic processing module 18 of logic device 16 produces an electronic image of the finger.

Figure 3:
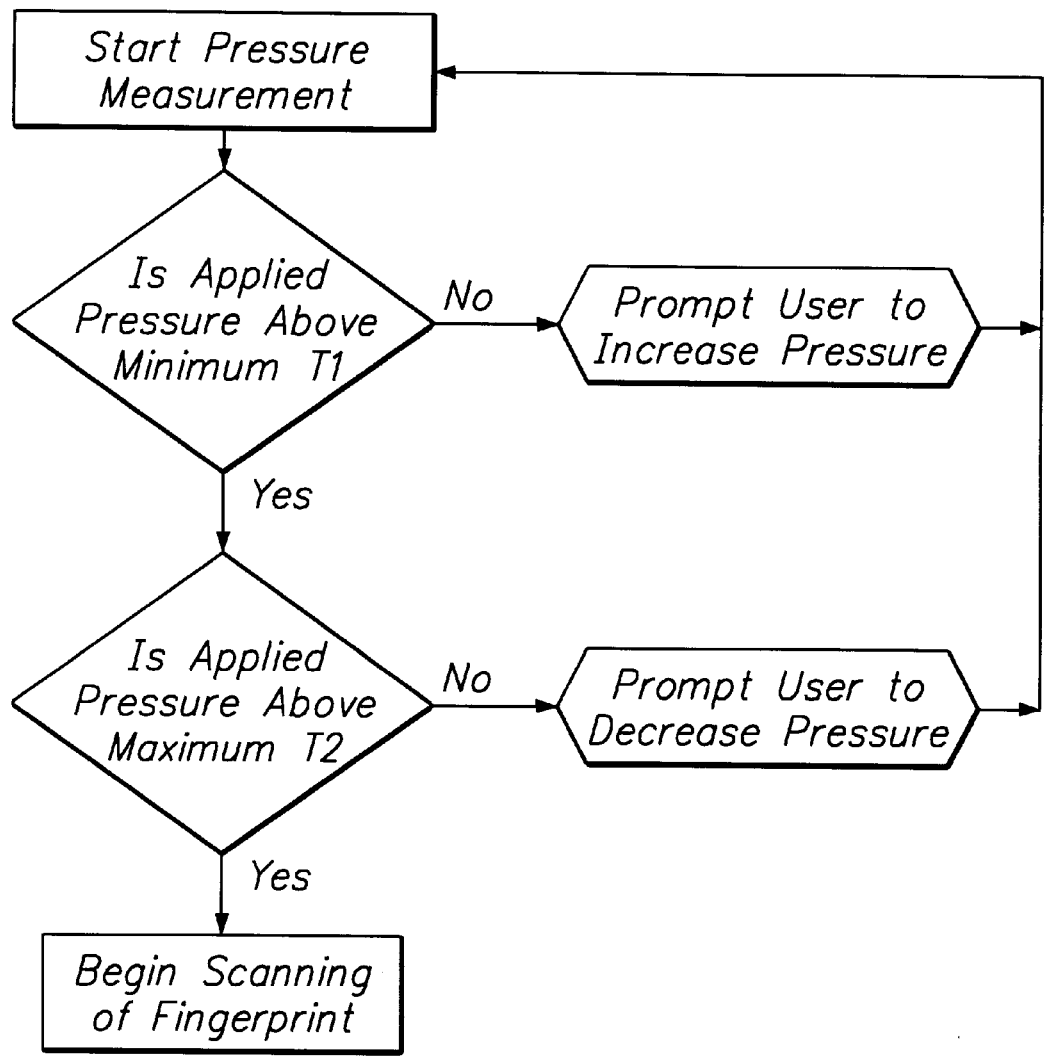
FIG. 3 shows a flow chart of an embodiment of the invention.

In operation, as shown in FIG. 3, the measurement for applied pressure of a finger 12 upon contact surface 14 occurs either before or after the finger is scanned. In a preferred embodiment, the amount of pressure applied to the contact surface is measured before the fingerprint scanning process occurs, and scanning does not occur unless the pressure exceeds a minimum threshold value. This is because the pressure check is quick to calculate, while the finger image scanning process is much more expensive both from a time as well as from a power standpoint. As shown in FIG. 2., once the finger is placed upon contact surface 14, the finger image scanner 10 measures the amount of pressure being applied to the contact surface. If the amount of pressure falls between the acceptable lower threshold T1 and upper threshold T2, as computed pressure processing module 22 of logic device 16, then the scanner begins the scanning process. The range of pressure applied to the contact surface is approximately between 6 ounces to 32 ounces per fingerprint surface area. More preferably, the range of pressure applied to the contact surface is approximately between 8 ounces to 16 ounces per fingerprint surface area. Since the vast majority of the population have acceptable fingerprint ridge and valley distinction, the predetermined pressure settings T1 and T2 will provide a good quality finger image. Once the finger print of a user is scanned, the logic processing module 18 of logic device 16 will determine whether the image obtained is a good quality image, or whether it is too dark or too light. Optical fingerprint scanners which includes logic processing module 18 of logic device 16 are commercially available from such companies as Identix Corp., Digital Persona, Inc., Digital Biometrics, Inc., and Startek, Inc. Non-optical finger image scanners are available from such companies as SGS-Thomson.

After scanning the finger image within the prescribed T1 and T2 thresholds, if the finger image is too dark, the pressure at which the image was scanned is examined. If the pressure is at the higher end of the pressure range (i.e. closer to T2), a preferred embodiment of the invention instructs the user to use less pressure, postulating that the user might have well-defined ridges and a decrease in pressure might well lighten the image to an acceptable level. Otherwise, this embodiment of the invention concludes that the most likely cause of the problem is too much moisture, and instructs the user to dry his or her finger and retry the scan.

After scanning the finger image within the prescribed T1 and T2 thresholds, if the finger image obtained is too light, the pressure at which the image was scanned is examined. If the pressure is at the lower end of the pressure range (i.e. close to T1), a preferred embodiment of the invention instructs the user to use less pressure, postulating that the user probably has very fine or dry ridges and an increase in pressure might well darken the image to an acceptable level. Otherwise, the problem is most likely that the finger is too dry, and this embodiment of the invention instructs the user to dampen his or her finger and retry the scan.

In either event, a determination of likely cause and possible remedy is made very quickly, and users can take remedial action to improve image quality and thus be identified, thus avoiding a likely false rejection of a legitimate user.

In several embodiments, the pressure sensor 20 comprises a thin-film pressure sensor, such as the Uniforce sensor produced by Force Imaging Technologies. This pressure sensor presents an electric resistance that is proportional to the pressure placed on the pressure sensor. This variable resistance is then converted to an analog voltage via a conventional op amp circuit. This analog voltage can then be processed by the logic device 16 as described previously. Thin-film pressure sensors have several advantages. First, they are extremely thin (0.003" in one example), thus allowing them to be placed conveniently relative to the contact surface 14 or the finger image scanner 12. Second, they are inexpensive.

Figure 4:
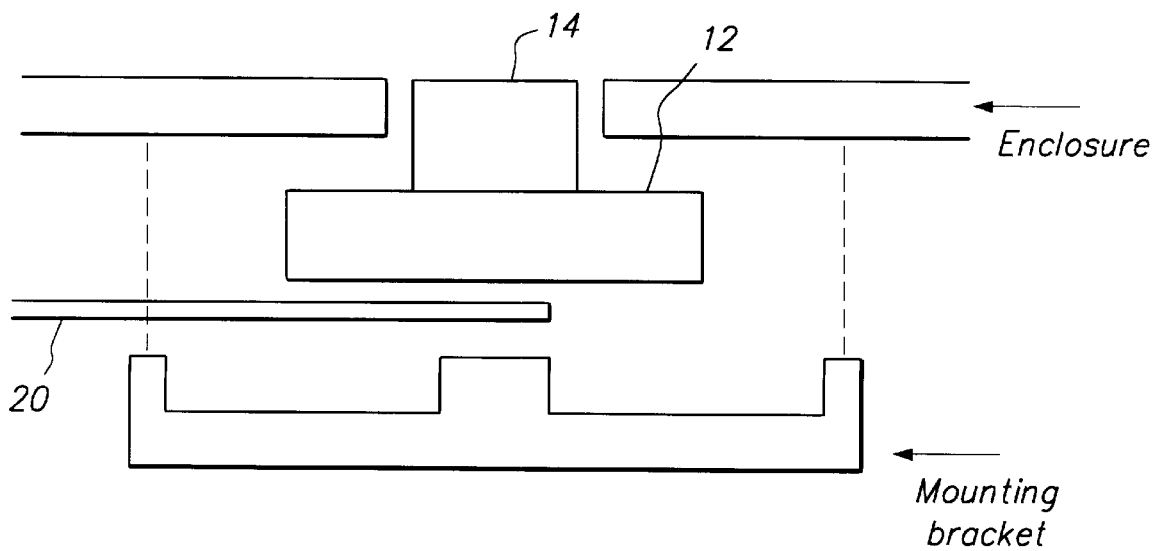
FIG. 4 shows an embodiment where the pressure sensor is placed directly behind the finger image scanner.

In one embodiment, the pressure sensor 20 is placed directly behind the finger image scanner 12, as shown in FIG. 4. This embodiment uses a thin-film pressure sensor, as described above. A mounting bracket holds the finger image scanner against the enclosure, and the pressure sensor is mounted between the finger image scanner and the mounting bracket. When a finger is placed on the contact surface, pressure is transferred to the pressure sensor. An advantage of this embodiment is that the pressure sensor is mounted directly behind the finger image scanner, and thus almost all of the pressure from the finger is directly transmitted to the pressure sensor. In this embodiment the logic device must account for a certain level of "preload" caused by compression of the pressure sensor between the mounting bracket and the finger image scanner.

Another embodiment is useful when the unit is supported via feet on a surface, as illustrated in FIG. 5. In this embodiment the pressure sensor is mounted between the enclosure and one of the enclosure's feet. Again, a thin-film sensor is used for the pressure sensor, although other types of pressure sensors may also be used. When a finger is placed on the contact surface, pressure is transferred to all the feet supporting the unit. The pressure sensor will read the pressure transferred to the foot under which it is mounted. In this embodiment the logic device must account for the fact that the full pressure of the finger is not directly transferred to the sensor, and the sensor will have a certain level of "preload" caused by the weight of the unit.

Another embodiment of the invention combines the finger image sensor and the pressure sensor in a single package, as shown in FIG. 6. In this case, the pressure sensor comprises a piezoresistive strain gauge. This strain gauge is attached to the back of the finger image sensor. When a finger is placed on the sensor, the pressure from the finger deforms the sensor package slightly. The strain gauge converts this deformation into a variable resistance that is proportional to the finger's pressure.

Yet another embodiment of the invention combines the finger image sensor and the pressure sensor in a single integrated circuit. In this embodiment capacitive pressure sensors are distributed on the surface of a capacitive fingerprint sensor via a CMOS-compatible silicon micromachining process. Averaging the output of the collection of pressure sensors provides an overall indication of the amount of pressure on the finger print sensor.

In other embodiments of the invention the pressure sensor comprises compressive load cells, LVDT transducers, capacitive transducers, piezoelectric transducers, and quartz transducers, as is known in the art.

Other embodiments will place the pressure sensor relative to the finger image scanner and contact surface in other ways, as will be apparent to one of skill in the art; all are to be considered within the scope of the present invention.

Although the invention has been described with respect to a particular system of obtaining good quality finger images, it will be appreciated that various modifications of the apparatus and method are possible without departing from the invention, which is defined by the claims set forth below.

What is claimed is:

1. A biometric input apparatus for obtaining a high quality image of the finger of a user, comprising;
    a) a finger image scanner, further having;
        i) a contact surface,
        ii) means for obtaining an electronic image of the finger of the user that is placed on the contact surface;
    b) a pressure sensor for detecting the amount of pressure that is applied by the finger of the user to the contact surface,
    c) a logic device that measures the amount of pressure exerted by the finger of the user and compares said pressure to a predetermined threshold pressure value; and
    d) a feedback loop, wherein the logic device prompts the user to increase or decrease the pressure applied to the contact surface.

2. The apparatus of claim 1 wherein the logic device allows a scan to occur only when the logic device determines that the pressure exerted by the finger of the user is within predetermined threshold values.

3. The apparatus of claim 1 wherein the acceptable amount of pressure applied to the contact surface is approximately between 6 ounces and 32 ounces per finger surface area.

4. The apparatus of claim 1 wherein the acceptable amount of pressure applied to the contact surface is preferably approximately between 8 ounces and 16 ounces per finger surface area.

* * * * *

UNITED STATES PATENT AND TRADEMARK OFFICE
CERTIFICATE OF CORRECTION

PATENT NO.    : 6,131,464
DATED         : October 17, 2000
INVENTOR(S)   : Pare, Jr. et al.

It is certified that error appears in the above-identified patent and that said Letters Patent is hereby corrected as shown below:

Column 2,
Line 58, "Fig. 5 shows" should read -- Fig. 5A is a perspective view and Fig. 5B is an elevation view showing --.
Line 61, "Fig. 6 shows" should read -- Fig. 6A is a top plan view and Fig. 5B is a bottom plan view of an embodiment --.

Column 4,
Line 38, "Fig. 5" should read -- Fig. 5B --.
Line 52, "Fig. 6" should read -- Figs. 6A and 6B --.

Signed and Sealed this

Twelfth Day of November, 2002

Attest:

Attesting Officer

JAMES E. ROGAN
Director of the United States Patent and Trademark Office